United States Patent Office 3,586,678
Patented June 22, 1971

3,586,678
ISONIPECOTIC ACID DERIVATIVES
Hans Herbert Kühnis and Rolf Denss, Basel, Switzerland, assignors to Geigy Chemical Corporation, Ardsley, N.Y.
No Drawing. Filed Dec. 30, 1968, Ser. No. 788,068
Claims priority, application Switzerland, Jan. 11, 1968, 421/68
Int. Cl. C07d 29/30
U.S. Cl. 260—247.5
6 Claims

ABSTRACT OF THE DISCLOSURE 1-phenylalkyl-isonipecotic acid amides substituted in 4-position by allyl or propinyl as well as the pharmaceutically acceptable acid addition salts thereof are antitussive agents. Pharmaceutical compositions containing these compounds and method for producing an antitussive effect in mammals comprising administering such compounds are provided. An illustrative embodiment is 1-(3-phenyl-propyl)-4-allyl-isonipecotic acid morpholide.

DETAILED DESCRIPTION

The present invention relates to novel 1-phenylalkyl-isonipecotic acid amides which have valuable pharmacological properties, to pharmaceutical compositions and to methods of producing an antitussive effect.

More in particular, the present invention relates to compounds of the formula

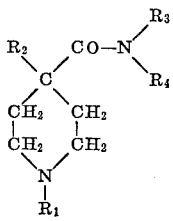

(I)

wherein $R_1$ is phenylalkyl having at most 9 carbon atoms,
$R_2$ is allyl or propinyl, and
$R_3$ and $R_4$ are, independently of each other, hydrogen, lower alkyl or lower alkenyl, or
$R_3$ and $R_4$ are, together with the adjacent nitrogen atom, polymethyleneimino having from 5 to 7 ring members, or morpholino, and to pharmaceutically acceptable acid addition salts thereof.

This invention also includes pharmaceutical compositions which comprise a compound as defined hereinabove, together with a suitable pharmaceutical carrier, and the method of producing an antitussive effect comprising administering such compound.

The compounds of Formula I and said acid addition salts thereof have an antitussive activity which is combined with a favorable therapeutic index, whereas no analgesic effects are observed.

A preferred subclass, on account of their antitussive activity, are the compounds of Formula I, wherein $R_1$ is 3-phenylpropyl,
$R_2$ is allyl or propinyl,
$R_3$ is hydrogen and
$R_4$ is hydrogen, methyl, isopropyl or allyl, or
$R_3$ and $R_4$ together with the adjacent nitrogen atom is morpholino.

Particularly good antitussive activity exhibit the hydrochlorides of N - methyl - 1-(3-phenylpropyl)-4-allyl-isonipecotamide, N-isopropyl-1(3-phenylpropyl)-4-allyl-isonipecotamide, 1-(3-phenylpropyl)-4-allyl-isonipecotic acid morpholide and 1-(3-phenylpropyl)-4-(2-propinyl)-isonipecotic acid morpholide. These compounds are preferred members of the above subclass.

As an example of the use of the compounds of the present invention, the use of 1(3-phenylpropyl)-4-allyl-isonipecotic acid morpholide hydrochloride in producing an antitussive effect in cats will be described. The method is that described by R. Domenjoz, Arch. exp. Path. and Pharmakol, 215, 19–24 (1952).

Healthy cats of normal weight are narcotized by intraperitoneal injection of 30–65 mg./kg. of aprobarbital so that a relatively superficial narcosis is obtained. About 45 minutes after the injection of the narcotic, the preparation of the Nervus laryngeus superior is started by fitting on an irritation-electrode. An apparatus manufactured by "Grass Medical Instruments," Type SD5 allowing irritation of the aforesaid nerve with rectangular current-impulses of any desired frequency and intensity is connected to the electrode. The irritation-frequency applied is 5 cycles at an irritation-intensity between 0.5 and 3 volts. The irritation-duration is about 8 seconds and the interval between two irritations is about 120 seconds. For the registrations of the cough reflexes, a Marey capsule is used. A respiriation-cannula is introduced through the oral cavity down to the glottic chink. The hydrochloride of 1-(3-phenylpropyl)-4-allyl-isonipecotic acid morpholide is injected intravenously in form of an 0.5% aqueous solution just before the irritation starts. Cough reflexes are inhibited with about 1 mg./kg. of the active compound.

Similar results are obtained with other compounds of the invention, particularly with the preferred members of the subclass.

A further method of showing the antitussive activity is to determine the manner in which tussive irritation in guinea pigs caused by sulphur dioxide is stopped as a result of subcutaneous or oral administration of the test substances: In a preliminary experiment for selecting animals for testing, male guinea pigs are exposed in a plexiglass chamber to a $SO_2$—$CO_2$-air mixture, flowing through at atmospheric pressure, and with a constant mixture ratio of 20 ml.:1.5 liters:10.5 liters per minute, until commencement of coughing or for a maximum of 120 secs. The assessment of the commencement of coughing is made by inspection. The guinea pigs reacting by coughing (ca. ⅔ of all animals) are formed into groups, each containing 6 animals. Ca. 24 hours after the preliminary test, these groups of experimental animals receive the test substance, administered subcutaneously or perorally, in various dosages suitable for ascertaining the $ED_{50}$ in mg./kg. Exposure to the irritant gas occurs in the same manner as in the preliminary test after 30 and after 90 minutes following application of the test substances. Assessment of the commencement of coughing is again made by inspection. From the percentage figures, obtained in the case of various dosages, of animals no longer reacting to $SO_2$, the dosage (=$ED_{50}$) preventing the occurrence of coughing in the case of 50% of the animals is determined by graphical interpolation using the Schleicher and Schüll 298 ½ probability graph.

The preferred members of the subclass were found to have an $ED_{50}$ of about 50 to about 75 mg./kg. on oral administration.

The acute toxicity of the compounds of the invention is of lower order as determined in mice on intravenous administration.

Of particular advantage is the fact that the compounds of the invention have no, or only insignificant analgesic activity. This lack of analgesic activity becomes apparent in the test according to the method of F. Gross, Helvet.

Physiol. Acta. 5, C31 (1947), whereby the apparatus of Friebel is used. The apparatus comprises an electrically heated lamp which is placed in the focus of a semi-elliptical metal concave mirror. Under the mirror, on a turn-tabel, there are located 10 small plexiglass cages, each holding a white mouse in such a position that the mouse-tail rests stretched out in a small groove on a plexiglass plate. The turn-table can be turned so that the mouse-tails one after the other come to be placed into the second focus of the elliptical mirror. Pain is induced by the convergent heat radiation from the mirror and the time is measured from the moment when the heat reaches the mouse-tail till the moment at which the mouse twiches its tail.

Two series of 10 mice each are tested prior to the administration of the test compound and the normal re-action time for each mouse is recorded. Then the test compound is administered orally and the reaction times after the injection are recorded, thus enabling determination of the intensity and the duration of the analgesic effect of the test compound administered.

The preferred members of the compounds of the invention exhibit in this test during 60 minutes either none or only an insignificant increase of the threshold of irritation (prolongation of reaction time) if administered intraperitoneally in dosages of about 20 to about 50 mg./kg.

The new piperidine derivatives of the Formula I and their pharmaceutically acceptable acid addition salts are suitable as active substances for pharmaceutical preparations for the treatment of the cough, particularly for relieving and overcoming tussive irritation. Administration can be performed orally, rectally or parenterally.

In the compounds of the Formula I and in the appertaining starting substances stated below, $R_1$ is, e.g. a phenyl alkyl group, such as the benzyl group, the 2-phenylethyl, or the 3-phenylpropyl group. $R_3$ and $R_4$ are, independent of each other, e.g. hydrogen, methyl, ethyl, n-propyl, isopropyl, n-butyl, isobutyl, sec. butyl, n-pentyl, isopentyl, neopentyl, n-hexyl, allyl, crotyl, 1-methylallyl, 2-methylallyl. Together with the adjacent nitrogen atom, $R_3$ and $R_4$ represent, e.g. the 1-pyrrolidinyl, piperidino, hexahydro-1H-1-azepinyl, or the morpholino group.

To produce the new piperidine derivatives of Formula I and their acid addition salts, a carboxylic acid of the Formula II

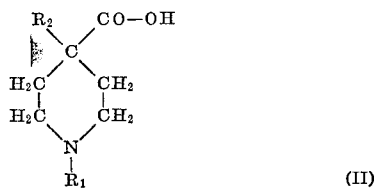

(II)

wherein $R_1$ and $R_2$ have the meaning given under Formula I, or a reactive functional derivative of a suchlike carboxylic acid is reacted with a base of the Formula III

(III)

wherein $R_3$ and $R_4$ have the meaning stated under Formula I or with a reactive functional derivative or an acid addition salt of the latter, and the obtained compound of the general Formula I is optionally converted into an addition salt with an inorganic or organic acid. In carrying out this process, for example, an acid of the Formula II is reacted with a base of the Formula III in the presence of a carbodiimide, such as for example dicyclohexyl-carbodiimide, in an inert solvent, such as, e.g. tetrahydrofuran.

Suitable as reactive functional derivatives of acids of the Formula II are in particular the halides, and also anhydrides, e.g. the mixed anhydrides with carboxylic acid-semi-esters. These functional derivatives are reacted with a compound of the Formula III preferably in the presence of an excess of the reaction components of the Formula III in the presence or absence of an inert organic solvent, such as, e.g. methylene chloride, benzene, tetrahydrofuran or dimethyl formamide. In place of an excess of a compound of the Formula III, an acid binding agent, e.g. a strong tertiary organic base, such as triethylamine, pyridin or s-collidine can also be used and optionally can also serve in excess as a reaction medium.

Activated esters of acids of the Formula II are, e.g. p-nitro-phenyl esters and cyanmethyl esters thereof, which are reacted with compounds of the Formula III in inert organic solvents, if necessary by heating. The 1-imidazolide of the stated acids are reacted under similar conditions with compounds of the Formula III.

Also suitable as reactive functional derivatives of acids of the Formula II are lower alkyl esters and phenyl esters thereof.

As reactive functional derivatives of compounds of the Formula III, which can be reacted direct with acids of the Formula II, mention is made of the isocyanates and isothiocyanates derived from compounds of the Formula III having a hydrogen atom as $R_3$. The isocyanates and isothiocyanates are heated with the acids of the Formula II, until the equimolar quantity of carbon dioxide and carbon oxysulphide respectively is liberated. The reactions with isocyanates and isothiocyanates can be carried out in the presence or absence of an inert organic solvent of sufficiently high boiling point and boiling range.

In place of isocyanates preliminary stages thereof can also be used. In addition, e.g. N-chlorocarbonyl derivatives of compounds of the Formula III, wherein neither $R_3$ nor $R_4$ signify hydrogen, are reacted with salts, e.g. alkali salts of acids of the Formula II, in the presence or absence of inert organic solvents, and the reaction mixtures heated, until the equimolar amount of carbon dioxide is liberated from the primarily formed carboxylic acid-carbamic acid-anhydrides. Likewise from compounds of the Formula III with a lower alkyl radical as $R_3$, sulphurous acid-monoalkyl ester-amides and phosphorous acid-o-phenylene diester-amides can be derived, which when reacted with acids of the Formula II in organic solvents, such as, e.g. pyridine, dioxane or dimethyl formamide and benzene, respectively, yield the desired amides of the Formula I.

According to a second process for producing the new piperidine derivatives of the Formula I and acid addition salts thereof, a compound of the Formula IV

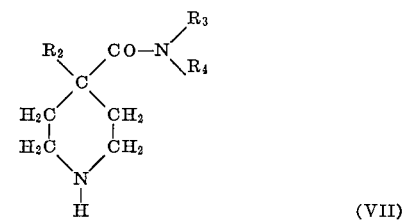

(VII)

wherein $R_2$, $R_3$ and $R_4$ have the meaning given under Formula I, is reacted with a reactive ester of a compound of the Formula V

$R_1$—OH (V)

wherein $R_1$ has the meaning given under Formula I, and optionally the obtained compound of the Formula I is converted into an addition salt with an inorganic or organic acid. The reaction is carried out at room temperature or at a moderately elevated temperature in a suitable organic solvent, such as, e.g. ethanol, acetone, diethyl ketone or dimethyl formamide. If desired, the reaction is accelerated by adding acid-binding agents, such as, e.g. potassium carbonate, and/or catalysts, such as for example potassium iodide. Suitable as reactive esters of compounds of the Formula V are, in particular, halogen hydracid esters, such as bromides, chlorides and iodides, and in addition arene sulphonic acid esters, such as, e.g. p-toluene sulphonic acid esters. The starting materials of the Formula V are for their part new compounds, the production of which is explained below.

The 1,4-disubstituted isonipecotic acids of the Formula II, require as direct or indirect starting materials for the first process are obtained for example by quaternisation of lower isonicotinic acid alkyl esters with reactive esters of compounds of the Formula V, by catalytic hydration of the quaternary reaction products, i.e. in the presence of rhodium-aluminum oxide-catalysts, to obtain 1 - substituted lower isonipecotic acid alkyl esters and allylation and propinylation, respectively, of the latter in their 4-position, and finally hydrolysis.

The allylation or propinylation is performed by transformation of the 1-substituted, lower isonipecotic acid alkyl esters into their alkali metal compounds and reaction of the latter with reactive esters of allyl alcohol or of 2-propin-1-ol, such as e.g., bromides, iodides or chlorides. Suitable as the reaction medium is, for example, a mixture of absolute diethyl ether or tetrahydrofuran and 1,2-dimethoxy ethane (ethylene glycol dimethyl ether). The alkali metal compounds of the 1-substituted isonipecotic acid alkyl esters are produced in situ from other suitable organic alkali metal compounds. The triphenylmethyl lithium, which is a particularly suitable suchlike compound is preferably likewise formed in situ from another organic lithium compound, such as phenyl lithium, by adding for example a solution of triphenyl methane in 1,2-dimethoxy ethane to the phenyl lithium, which is produced in the known manner, present in diethyl ether. Since the triphenylmethyl lithium produces intensively coloured solutions, its formation and also its consumption by the subsequently added 1-substituted isonipecotic acid alkyl ester can be easily followed. Triphenylmethyl sodium or triphenylmethyl potassium can also be used, for example, instead of triphenyl lithium. The stages of the process are mostly slightly exothermic and can be carried out at room temperature or at moderately increased temperature. It must be possible, if need be, to cool the reaction mixture, depending on the starting materials and the amounts used. The reactive functional derivatives of the acids of the Formula II are produced in the usual manner, acid chlorides, for example, preferably with the aid of oxalyl chloride. The 1-substituted lower isonipecotic acid alkyl esters occurring in the above reaction sequence as intermediate products, can also be produced, for example, by reacting lower isonipecotic acid alkyl esters with reactive esters of compounds of the Formula V analogously to the second process for producing compounds of the Formula I.

For producing starting materials of the Formula IV for example, lower isonipecotic acid alkyl esters are reacted with chloroformic acid benzyl ester to obtain 1-benzyloxy carbonyl-isonipecotic acid alkyl esters, and in the 4-position of the latter, are introduced the allyl or 2-propinyl group in a manner analogous to that described above for the production of lower isonipecotic acid alkyl esters, substituted in the 1-position by $R_1$. The reaction products are subjected to a mild alkaline hydrolysis, the formed 1-benzyloxycarbonyl - 4 - allyl-isonipecotic acid and -4-(2-propinyl)-isonipecotic acid, respectively, are converted into their acid chloride, and the latter is reacted, analogously to the first process for producing compounds of the Formula I, with a base of the Formula III. The 1-benzyloxycarbonyl group is split off from the obtained amide by the action of hydrogen bromide in glacial acetic acid at room temperature. The N-substituted 1-benzyloxycarbonyl - 4-allyl-isonipecotamides or -4-(2 - propinyl)-isonipecotamides occurring in this reaction sequence as the final intermediate products can be produced for example by reacting corresponding N-substituted 1-methyl- or 1-benzyl - 4 - allyl - isonipecotamides or -4-(2-propinyl)-isonipecotamides with chloroformic acid benzyl ester.

Optionally, the piperidine derivatives of the Formula I, obtained using the processes according to the invention, are subsequently converted in the usual manner into their addition salts with inorganic and organic acids. For example, a solution of a piperidine derivative of the Formula I in an organic solvent, such as diethyl ether, methanol or ethanol, is mixed with the acid desired as the salt component, or a solution thereof. The salt, which has precipitated immediately or after addition of a second organic liquid, such as, e.g. diethyl ether to methanol, is then separated.

For use as active substances for medicaments, pharmaceutically acceptable acid addition salts can be used instead of free bases, i.e. salts with those acids, the anions of which in the case of the dosages concerned exhibit either no pharmacological action or which themselves have a desired pharmacological action. Moreover, it is of advantage, if the salts to be used as active substances crystallise well and are not or only slightly hygroscopic. Hydrochloric acid, hydrobromic acid, sulphuric acid, phosphoric acid, methane sulphonic acid, ethane sulphonic acid, $\beta$-hydroxyethane sulphonic acid, acetic acid, malic acid, tartaric acid, citric acid, lactic acid, succinic acid, fumaric acid, maleic acid, benzoic acid, salcylic acid, phenylacetic acid, mandelic acid, embonic acid, cyclohexylaminosulphonic acid or 1,5-naphthalene disulphonic acid, for example, can be used for salt formation with piperidine derivatives of the Formula I.

The new piperidine derivatives of the Formula I and their salts are administered orally, rectally or parenterally. The daily dosages of free bases or of pharmaceutically acceptable salts thereof vary between 0.1 and 3 mg./kg. for adult mammals. Suitable dosage units, such as dragées (sugar coated tablets), capsules, tablets, suppositories or ampoules, preferably contain 1–100 mg. of a piperidine derivative of the Formula I or of pharmaceutically acceptable salt thereof.

Dosage units for oral application contain as active substance preferably between 1% and 90% of a piperidine derivative of the Formula I or of a pharmaceutically acceptable salt thereof. They are produced by combining the active substance with e.g. solid, pulverulent carriers, such as lactose, sucrose, sorbitol, mannitol; starches such as potato starch, maize starch or amylopectin, also laminaria powder or citrus pulp powder; cellulose derivatives or gelatine, optionally with the addition of lubricants, such as magnesium or calcium stearate or polyethylene glycols, to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance. Other suitable dosage units for oral administration are hard gelatine capsules and also soft, closed capsules made of gelatine and a softener such as glycerine. The former preferably contain the active substance as a granulate in admixture with lubricants such as talcum and magnesium stearate, and optionally stabilisers such as sodium metabisulphite or ascorbic acid. In soft capsules, the active substance is preferably dissolved or suspended in suitable liquids such as liquid polyethylene glycols, whereby likewise stabilisers can be added.

In addition, for the treatment of coughs, lozenges and also multi-dosage oral forms of administration, such as, e.g. cough syrups or cough drops prepared with the usual auxiliaries, are suitable.

Dosage units for rectal administration are, e.g., suppositories which consist of a combination of a piperidine derivative of the Formula I or a suitable salt thereof with a neutral fatty foundation, or also gelatin rectal capsules which contain a combination of the active substance with polyethylene glycols.

Ampoules for parenteral, particularly intramuscular administration, and also intravenous administration, preferably contain a water-soluble salt of a piperidine derivative of the Formula I as active substance in a concentration of preferably 0.5–5%, optionally together with suitable stabilisers and buffer substances, in aqueous solution.

The following prescriptions further illustrate the production of forms of application according to the invention:

(a) 10 g. of active substance, e.g. 1-(3-phenylpropyl)-4-allyl-N-isopropyl isonipecotamide hydrochloride, 30 g. of lactose and 5 g. of highly dispersed silicic acid are mixed. The mixture is moistened with a solution of 5 g. of gelatine and 7.5 g. of glycerine in distilled water and granulated through a sieve. The granulate is dried, sieved and carefully mixed with 3.5 g. of potato starch, 3.5 g. of talcum and 0.5 g. of magnesium stearate. From the mixture are pressed out 1000 tablets, each weighing 65 mg. and containing 10 mg. of active substance.

(b) 5 g. of active substance, e.g. 1-(3-phenylpropyl)-4-allyl isonipecotic acid morpholide hydrochloride, 15 g. of lactose and 20 g. of starch are mixed. The mixture is moistened with a solution of 5 g. of gelatine and 7.5 of glycerine in distilled water and granulated through a sive. The granulate is dried, sieved and carefully mixed with 3.5 g. of talcum and 0.5 g. of magnesium stearate. 1000 dragée cores are pressed out from the mixture. These are then coated with a concentrated syrup made from 26.66 g. of crystallised sucrose, 17.5 g. of talcum, 1 g. of shellac, 3.75 g. of gum arabic, 1 g. of highly dispersed silicic acid and 0.090 g. of dyestuff and then dried. The obtained dragées weigh 110 mg. each and each contain 5 mg. of active substance.

(c) To produce 1000 capsules each containing 10 mg. and 25 mg. respectively, of active substance, 10 g. and 25 g., respectively, of 1-(3-phenylpropyl)-4-allyl-N-methyl isonipecotamide hydrochloride are mixed with 263 g. and 248 g., respectively, of lactose. The mixture is moistened unifarmly with an aqueous solution of 2 g. of gelatine and is granulated through a suitable sieve (e.g. Sieve III according to Ph. Helv. V). The granulate is mixed with 10 g. of dried maize starch and 15 g. of talcum and is then evenly filled into 1000 hard gelatine capsules, size 1.

(d) To prepare a cough syrup containing 0.5% of active substance, 1.5 litres of glycerin, 42 g. of p-hydroxybenzoic acid methyl ester, 18 g. of p-hydroxybenzoic acid n-propyl ester and, while slightly warming, 50 g. of 1-(3-phenylpropyl)-4-allyl isonipecotic acid morpholide hydrochloride are dissolved in 3 litres of distilled water. 4 litres of 70% sorbitol solution, 1000 g. of crystallised sucrose, 350 g. of glucose and a flavouring, e.g. 250 g. of "Orange Peel Soluble Fluid" produced by Eli Lilly and Co., Indianapolis, or 5 g. of natural lemon flavouring and 5 g. of "Halb und Halb" essence, both produced by Haarmann and Reimer, Holzminden, Germany, are added. The obtained solution is filtered and the filtrate is made up to 10 litres with distilled water.

(e) A cough syrup containing 0.25% of active substance is produced as follows: 25 g. of 1-(3-phenylpropyl)-4-allyl-isonipecotic acid morpholide hydrochloride are dissolved while warming in a mixture of 2.5 litres of water and 0.5 litre of ethanol (96%). In addition, a syrup is boiled consisting of 30 litres of water, 1 litre of 70% sorbitol solution, 3000 g. of crystallised sucrose, 42 g. of p-hydroxybenzoic acid methyl ester and 18 g. of p-hydroxybenzoic acid n-propyl ester, and the syrup is carefully mixed with the solution of active substance. After the addition of flavourings, e.g. those stated under (d) and, if necessary, filtration, the obtained syrup is made up to 10 litres with distilled water.

(f) To prepare cough drops containing 2.5% of active substance, 250 g. of 1-(3-phenylpropyl)-4-allyl isonipecotic acid morpholide hydrochloride and 30 g. of sodium cyclamate are dissolved in a mixture of 4 litres of ethanol (96%) and 1 litre of propylene glycol. In addition, 3.5 litres of 70% sorbitol solution are mixed with 1 litre of water and the mixture is added to the above solution of active substance. A flavouring, e.g. 5 g. of coughdrop aroma or 30 g. of grapefruit essence, both produced by Haarmann and Reimer, Holzminden, Germany, is added and the whole is well mixed, filtered and made up to 10 litres with distilled water.

(g) A suppository mixture is prepared consisting of 2.5 g. of 1-(3-phenylpropyl)-4-allyl isonipecotic acid morpholide hydrochloride and 167.5 g. of *Adeps solidus* and with this mixture 100 suppositories are filled each containing 25 mg. of active substance.

(h) 2 g. of 1-(3-phenylpropyl)-4-allyl isonipecotic acid morpholide hydrochloride and 2.2 g. of glycerin are dissolved in distilled water to give 100 ml., and from the solution are filled 100 ampoules each of 1 ml. and each containing 20 mg. of active substance.

The following examples illustrate the production of the new compounds of the Formula I but they in no way limit the scope of the invention. Temperatures are given in degrees centigrade.

EXAMPLE 1

6.3 g. of 1-(3-phenylpropyl)-4-allyl isonipecotic acid ethyl ester are refluxed in 20 ml. of 20% potassium hydroxide solution and 30 ml. of ethanol are refluxed for 8 hours. The reaction solution is then made acidic with concentrated hydrochloric acid and concentrated by evaporation. The residue, as far as possible, is dissolved in methylene chloride. The solution is filtered and concentrated by evaporation, whereby the crude hydrochloride of the 1-(3-phenylpropyl)-4-allyl isonipecotic acid remains behind.

The above acid hydrochloride is again dissolved in 40 ml. of methylene chloride and a mixture of 30 ml. of oxalyl chloride and 20 ml. methylene chloride is added while stirring within 15 minutes at room temperature. The reaction mixture is then stirred for a further 30 minutes and then concentrated by evaporation in vacuo at 30°, whereby the 1-(3-phenylpropyl)-4-allyl isonipecotoyl chloride hydrochloride crystallises out.

The obtained crude acid chloride hydrochloride is dissolved in 50 ml. of methylene chloride. While stirring and cooling with ice, the mixture of 30 ml. of methylamine and 20 ml. of methylene chloride is added dropwise to to this solution within 15 minutes. The reaction mixture is stirred for a further hour and then concentrated by evaporation in vacuo. The residue is mixed with 20 ml. of water and extracted with methylene chloride. The methylene chloride solution is dried and evaporated and the residue mixed with a small excess, relative to the initially used ester, of ethereal hydrogen chloride solution. The N-methyl-1-(3-phenylpropyl)-4-allyl isonipecotamide hydrochloride, which has crystallised out, is filtered off, M.P. 204–206°.

If necessary, the residue of the above methylene chloride extract, which consists of crude N-methyl-1-(3-phenylpropyl)-4-allyl isonipecotamide, is purified of salt formation by chromatography on silica gel in a mixture of chloroform-methanol of 95:5.

In an analogous manner, using ammonia or the corresponding amines in place of methylamine, the following amides and their hydrochlorides are produced:

1-(3-phenylpropyl)-4-allyl isonipecotamide hydrochloride, M.P. 214–215°;

N-ethyl-1-(3-phenylpropyl) - 4 - allyl isonipecotamide hydrochloride, M.P. 178–179°;

N-n-propyl-1-(3-phenylpropyl)-4-allyl isonipecotamide hydrochloride, M.P. 178–179°;

N-isopropyl-1-(3-phenylpropyl) - 4-allyl isonipecotamide hydrochloride, M.P. 146–147°;

N-n-butyl-1-(3-phenylpropyl)-4-allyl isonipecotamide hydrochloride, M.P. 175–176°;

N,N-dimethyl-1-(3-phenylpropyl)-4-allyl isonipecotamide hydrochloride, M.P. 140–141°;

N-allyl-1-(3-phenylpropyl)-4-allyl isonipecotamide hydrochloride, M.P. 173–174°.

The 1-(3-phenylpropyl)-4-allyl isonipecotic acid ethyl ester, required as starting material, is produced as follows:

(a) 20 g. of isonicotic acid ethyl ester are refluxed with 75.5 g. of 3-phenylpropyl bromide in 100 ml. of ethanol for 5 hours. The ethanol is then evaporated off under vacuum, the residue dissolved in water and the aqueous solution extracted three times with ether. With concentration of the aqeuous solution by evaporation in vacuo and finally under high vacuum, the ethyl ester of the 4-carboxy-1-(3-phenylpropyl pyridinium bromide remains behind.

(b) 24.1 g. of the above quaternary salt are hydrogenated in the presence of rhodium/aluminium oxide catalyst (5% Rh) in 200 ml. of ethanol at room temperature and 3-4 atm. pressure. The catalyst is then filtered off and the filtrate concentrated. The residue is covered with chloroform and made alkaline with concentrated sodium hydroxide solution. The chloroform is removed and the aqueous phase exhaustively extracted with chloroform. The combined chloroform solutions are washed with saturated sodium chloride solution, dried and concentrated and the residue is distilled under high vacuum. The 1-(3-phenylpropyl) isonipecotic acid ethyl ester boils at 130–132°/0.08 Torr.

(c) In a 350 ml. four-necked flask, 0.98 g. of lithium wire, cut into small pieces and washed with petroleum ether, are added under nitrogen to 11.0 g. of bromobenzene in 100 ml. of abs. ether while stirring, whereby the ether commences to boil. After the reaction has subsided, the mixture is refluxed for another 2½ hours. 17.1 g. of triphenylmethane in 80 ml. of abs. 1,2-dimethoxyethane are added all at once to the obtained solution of phenyl lithium, whereby, due to the formation of triphenylmethyl lithium, the solution assumes a deep red colour and gently boils. After 20 minutes stirring at room temperature, 18.3 g. of 1-(3-phenylpropyl) isonipecotic acid ethyl ester in 20 ml. of abs. ether are added at 28°. Accompanied by a slight increase in temperature, the deep red solution loses its colour. It is stirred for 10 minutes at room temperature and then mixed all at once with 8.45 g. of allyl bromide in 20 ml. of abs. ether. The mixture is stirred for 2½ hours at room temperature, whereby it becomes yellowish in colour and lithium bromide precipitates out. The reaction mixture is then decomposed with 10 ml. of water and concentrated in the rotary evaporator. Ether is added to the residue and the obtained ether solution extracted four times with diluted hydrochloric acid. The acid extracts are made alkaline and exhaustively extracted with chloroform, the chloroform extracts being then dried and concentrated. The residue is taken up in ether, the ether solution dried and concentrated and the residue distilled. The 1-(3-phenylpropyl)-4-allyl isonipecotic acid ethyl ester boils at 178°/0.01 Torr, fumarate M.P. 138° (from isopropanol).

EXAMPLE 2

6.3 g. of 1-(3-phenylpropyl)-4-allyl isonipecotic acid ethyl ester (see Example 1(a), (b) and (c)) are converted according to the two first paragraphs of Example 1, into the crude acid chloride hydrochloride. This is dissolved in 50 ml. of methylene chloride and, while stirring and cooling with ice, 25 ml. of morpholine in 50 ml. of methylene chloride are added dropwise to the obtained solution within a period of 15 minutes. The reaction mixture is then stirred for another hour and then concentrated in vacuo. The residue is mixed with 40 ml. of water and extracted with methylene chloride. The methylene chloride solution is dried and concentrated by evaporation and the residue mixed with a small excess of ethereal hydrogen chloride solution. The formed 1-(3-phenylpropyl)-4-allyl isonipecotic acid morpholide hydrochloride is filtered off and optionally recrystallised from acetone ether, M.P. 184–185°.

The following are obtained in an analogous manner:

1-(3-phenylpropyl)-4-allyl isonipecotic acid pyrrolidide hydrochloride, M.P. 173–174°;
1-(3-phenylpropyl)-4-allyl isonipecotic acid piperidide hydrochloride, M.P. 123–124°.

EXAMPLE 3

6.0 g. of 1-(3-phenylpropyl)-4-(2-propinyl)-isonipecotic acid ethyl ester (see below) are converted, analogously to the first paragraph of Example 1, into the crude hydrochloride of the corresponding acid. This is dissolved in 40 ml. of methylene chloride and a mixture of 25 ml. of oxalyl chloride and 50 ml. of methylene chloride is added dropwise while stirring within 15 minutes at room temperature. After a further 30 minutes stirring, the reaction mixture is concentrated in vacuo at 30°, whereby the 1 - (3 - phenylpropyl)-4-(2-propinyl) isonicotinoylchloride hydrochloride remains behind.

The obtained acid chloride hydrochloride is dissolved in 50 ml. of methylene chloride and, while stirring and cooling with ice, 25 ml. of morpholine in 50 ml. of methylene chloride are added dropwise within 15 minutes to the obtained solution. The reaction mixture is then stirred for another hour and then concentrated in vacuo. The residue is mixed with 40 ml. of water and extracted with methylene chloride. The methylene chloride solution is dried and concentrated and the residue mixed with a small excess of ethereal hydrogen chloride solution. The formed 1 - (3-phenylpropyl)-4-(2-propinyl) isonipecotic acid morpholide hydrochloride is filtered off and recrystallised from methylene chloride acetone ether, M.P. 186–187°.

Analogously, the following are obtained using methylamine or dimethylamine in place of morpholine:

N-methyl-1-(3-phenylpropyl) - 4 - (2-propinyl) isonipecotamide hydrochloride, M.P. 203–204°;
N,N-dimethyl-1-(3-phenylpropyl)-4-(2-propinyl) isonipecotamide hydrochloride, M.P. 170–181°.

The 1 - (3-phenylpropyl)-4-(2-propinyl)-isonipecotic acid ethyl ester, B.P. 170–172°/0.05 Torr, fumarate M.P. 153° (from isopropanol) is produced analogously to Example 1(a), (b) and (c), whereby in the case of (c), the same quantity of propargyl bromide (3-bromopropine) is used in place of allyl bromide.

EXAMPLE 4

15 g. of 1-(3-phenylpropyl)-4-allyl-isonipecotic acid ethyl ester with 50 ml. of 20% potassium hydroxide solution and 70 ml. of alcohol are refluxed for 8 hours. The mixture is then concentrated by evaporation in vacuo and the excess potassium hydroxide solution neutralized with 2 N hydrochloric acid and concentrated to dryness. 7.65 g. of the above mentioned mixture of the salt of the isonipecotic acid and sodium chloride are suspended in 50 ml. of toluene and to this are added 6.45 g. of dimethylcarbamyl chloride in 50 ml. of toluene within 5 minutes. The mixture is then slowly heated, whereby the evolution of gas at 90° is observed. The mixture is refluxed for a further 30 minutes, concentrated in vacuum, the residue boiled with ether, dried and evaporated. The hydrochloride is produced in the usual manner from the oil which remains. The 1-(3-phenylpropyl)-4-allyl-isonipecotic acid dimethyl amide hydrochloride melts at 140–141°.

EXAMPLE 5

1 g. of 4-allyl-isonipecotic acid ethyl ester with 6 ml. of 20% potassium hydroxide solution and 6 ml. of ethanol are refluxed for 6 hours. The mixture is then concentrated to dryness in vacuo and the moisture removed by repeated distilling with benzene. The residue is then taken up in 10 ml. of methylene chloride and mixed with a solution of 15 ml. of oxalyl chloride in 15 ml. of methylene chloride, whereupon the mixture is reacted for 15 minutes. The excess oxalyl chloride and the methylene chloride are evaporated at room temperature. The mixture is then evaporated once with benzene in vacuo and the residue is again dissolved in 10 ml. of methylene chloride. To this solution is added a solution of 10 ml. of morpholine in 15 ml. of methylene chloride. The mixture is stirred for 15 minutes and evaporated in vacuo. The residue is taken up in a little water, a little concentrated ammonia is added and the residue is extracted three times with methylene chloride. The methylene chloride is dried and evaporated, whereby the 4-allyl-isonipecotic acid morpholide remains. This residue is taken up in 10 ml. of diethyl ketone and refluxed for 12 hours with 5 ml. of 3-phenyl-propyl chloride and 0.5 g. of potash (potassium carbonate). The mixture is subsequently filtered, the filtrate concentrated by evaporation and the oil which remains is chromatographed on silica gel in chloroform/methanol 95:5. The 1-(3-phenylpropyl)-4-allyl-isonipecotic acid morpholide hydrochloride is produced with ethereal hydrochloric acid and recrystallised from acetone-ether. It has a melting point of 184–185°.

The following amides and their hydrochlorides are produced in an analogous manner:

1-(3-phenylpropyl)-4-allyl isonipectoamide hydrochloride, M.P. 214–215°;

N-ethyl-1-(3-phenylpropyl)-4-allyl isonipecotamide hydrochloride, M.P. 178–179°;

N-n-propyl-1-(3-phenylpropyl)-4-allyl isonipecotamide hydrochloride, M.P. 178–179°;

N-isopropyl-1-(3-phenylpropyl)-4-allyl isonipecotamide hydrochloride, M.P. 146–147°;

N-n-butyl-1-(3-phenylpropyl)-4-allyl isonipecotamide hydrochloride, M.P. 175–176°;

N,N-dimethyl-1-(3-phenylpropyl)-4-allyl isonipecotamide hydrochloride, M.P. 140–141°;

N-allyl-1-(3-phenylpropyl)-4-allyl isonipecotamide hydrochloride, M.P. 173–174°.

What we claim is:

1. A compound of the Formula I

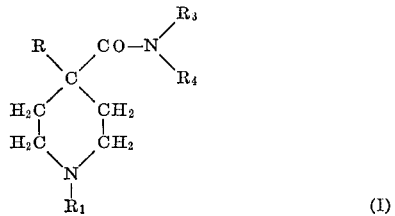

(I)

wherein $R_1$ is phenylalkyl having at most 9 carbon atoms, $R_2$ is allyl or propinyl, and $R_3$ and $R_4$ are, independently of each other, hydrogen, lower alkyl or lower alkenyl, or $R_3$ and $R_4$ are, together with the adjacent nitrogen atom, polymethyleneimino having from 5 to 7 ring members, or morpholino, and pharmaceutically acceptable acid addition salts thereof.

2. A compound according to claim 1, wherein
$R_1$ is 3-phenylpropyl,
$R_2$ is allyl or propinyl,
$R_3$ is hydrogen, and
$R_4$ is hydrogen, methyl, isopropyl or allyl, or
$R_3$ and $R_4$ together with the adjacent nitrogen atom, is morpholino, and pharmaceutically acceptable acid addition salts thereof.

3. A compound according to claim 1, wherein
$R_1$ is 3-phenylpropyl,
$R_2$ is allyl,
$R_3$ is hydrogen, and
$R_4$ is methyl.

4. A compound according to claim 1, wherein
$R_1$ is 3-phenylpropyl,
$R_2$ is allyl,
$R_3$ is hydrogen, and
$R_4$ is isopropyl.

5. A compound according to claim 1, wherein
$R_1$ is 3-phenylpropyl,
$R_2$ is allyl, and
$R_3$ and $R_4$ together with the adjacent nitrogen atom is morpholino.

6. A compound according to claim 1, wherein
$R_1$ is 3-phenylpropyl,
$R_2$ is 2-propinyl, and
$R_3$ and $R_4$ together with the adjacent nitrogen atom is morpholino.

References Cited
FOREIGN PATENTS 602,228   3/1961   Belgium _____ 260—294
4,176   3/1968   South Africa _____ 260—294.3

HENRY R. JILES, Primary Examiner

G. T. TODD, Assistant Examiner

U.S. Cl. X.R.

260—294; 424—267